United States Patent
Akuzawa et al.

(10) Patent No.: US 10,910,885 B2
(45) Date of Patent: Feb. 2, 2021

(54) POWER TRANSMISSION-SIDE APPARATUS

(71) Applicant: Mitsubishi Electric Engineering Company, Limited, Chiyoda-ku (JP)

(72) Inventors: Yoshiyuki Akuzawa, Chiyoda-ku (JP); Hirokazu Suzuki, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 83 days.

(21) Appl. No.: 16/475,212

(22) PCT Filed: Feb. 8, 2017

(86) PCT No.: PCT/JP2017/004545
§ 371 (c)(1),
(2) Date: Jul. 1, 2019

(87) PCT Pub. No.: WO2018/146746
PCT Pub. Date: Aug. 16, 2018

(65) Prior Publication Data
US 2019/0341814 A1  Nov. 7, 2019

(51) Int. Cl.
| H02J 50/60 | (2016.01) |
| H02J 50/12 | (2016.01) |
| H01F 38/14 | (2006.01) |
| H02J 50/10 | (2016.01) |

(52) U.S. Cl.
CPC .............. *H02J 50/60* (2016.02); *H01F 38/14* (2013.01); *H02J 50/12* (2016.02); *H02J 50/10* (2016.02)

(58) Field of Classification Search
CPC . H02J 50/10; H02J 50/12; H02J 50/60; H01F 38/14

USPC ......................................................... 307/104
See application file for complete search history.

(56) References Cited

U.S. PATENT DOCUMENTS

| 2008/0200119 | A1 | 8/2008 | Onishi et al. |
| 2011/0316553 | A1* | 12/2011 | Taguchi ................. B60L 58/00 |
| | | | 324/500 |
| 2016/0141882 | A1 | 5/2016 | Ichikawa |
| 2017/0366048 | A1 | 12/2017 | Watanabe et al. |
| 2018/0351370 | A1 | 12/2018 | Ichikawa |

FOREIGN PATENT DOCUMENTS

| JP | 2001-275280 A | 10/2001 |
| JP | 2008-206231 A | 9/2008 |
| JP | 2008-236917 A | 10/2008 |
| JP | 2013-158188 A | 8/2013 |
| JP | 2014-222994 A | 11/2014 |

(Continued)

OTHER PUBLICATIONS

International Search Report dated Apr. 25, 2017 in PCT/JP2017/004545 filed on Feb. 8, 2017.

(Continued)

*Primary Examiner* — Hal Kaplan
(74) *Attorney, Agent, or Firm* — Oblon, McClelland, Maier & Neustadt, L.L.P.

(57) ABSTRACT

There are included: a switching parameter detecting unit (21) that detects a switching voltage of a switching element (Q1); and an abnormality detecting unit (a first comparing unit (264a) and an abnormality determining unit (265)) that detects an abnormality caused by foreign matter, on the basis of a result of the detection by the switching parameter detecting unit (21).

8 Claims, 7 Drawing Sheets

(56) References Cited

FOREIGN PATENT DOCUMENTS

JP        2016-163493 A    9/2016
WO   WO 2014/203346 A1   12/2014

OTHER PUBLICATIONS

Japanese Office Action dated Nov. 7, 2017 in Japanese Patent Application No. 2017-512408 (with unedited computer generated English translation).

* cited by examiner

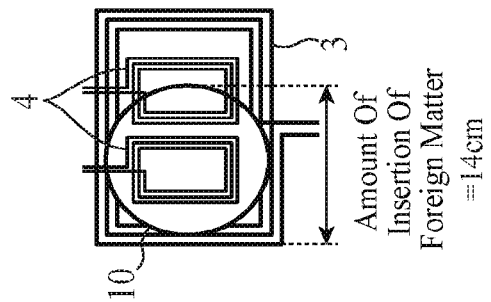
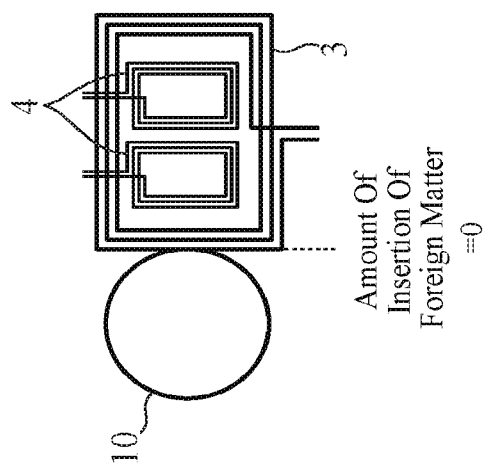
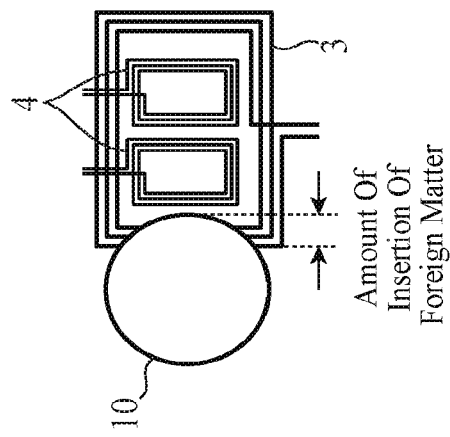

FIG. 8
|   | Condition | Detection Method |
|---|---|---|
| ① | Aluminum Foil Is Present | Detect That Vds Is Overvoltage |
| ② | DVD Is Present | Detect That Vds Is Overvoltage Or Detect That Iin Is Overcurrent |
| ③ | No Power Reception-Side Apparatus Is Installed | Detect That Vds Is Overvoltage |
FIG. 9A
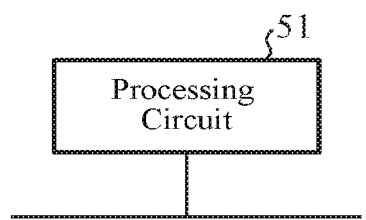
FIG. 9B
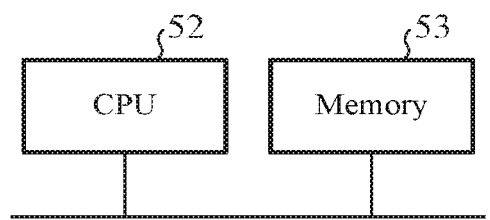

POWER TRANSMISSION-SIDE APPARATUS

TECHNICAL FIELD

The present invention relates to a power transmission-side apparatus that performs power transmission at a high frequency.

BACKGROUND ART

In a wireless power transmission system, when continuous power transmission continues with metallic foreign matter sandwiched between power transmitting and receiving coils, an eddy current flows through the foreign matter. The foreign matter includes a thin plate-like metal, a piece of aluminum foil, a digital versatile disc (DVD), a Blu-ray disc, etc.

Hence, there is conventionally known a wireless power transmission system that determines whether there is foreign matter between power transmitting and receiving coils, and thereby controls power supply (see, for example, Patent Literatures 1 and 2).

In a system disclosed in Patent Literature 1, a power reception-side apparatus such as a portable terminal is provided with dedicated detectors such as a voltage detecting unit and a current detecting unit, and information obtained by the dedicated detectors is transmitted from the power reception-side apparatus to a power transmission-side apparatus. Then, the power transmission-side apparatus determines, using the above-described information, whether there is an overcurrent caused by foreign matter present between power transmitting and receiving coils, and thereby controls power supply.

In addition, in a system disclosed in Patent Literature 2, an intermittent change in load is intentionally made by a power reception-side apparatus. Then, by monitoring the change in load by a power transmission-side apparatus, the power transmission-side apparatus determines whether there is foreign matter between power transmitting and receiving coils, and thereby controls power supply.

CITATION LIST

Patent Literatures

Patent Literature 1: JP 2001-275280 A
Patent Literature 2: JP 2008-206231 A

SUMMARY OF INVENTION

Technical Problem

However, in the system disclosed in Patent Literature 1, a determination as to whether there is an overcurrent caused by foreign matter is made by transmitting information between the power transmission-side apparatus and the power reception-side apparatus. Hence, complex signal processing is required between the power transmission-side apparatus and the power reception-side apparatus, placing a load on both of the power transmission-side apparatus and the power reception-side apparatus. In addition, in the system disclosed in Patent Literature 1, the dedicated detectors for detecting foreign matter are provided in the power reception-side apparatus, and thus, the number of components of the power reception-side apparatus increases, causing an increase in the size and cost of the apparatus. Since the power reception-side apparatus is a portable terminal, etc., the increase in the number of components of the power reception-side apparatus is not desirable.

In addition, in the system disclosed in Patent Literature 2, an intermittent change in load is intentionally made by the power reception-side apparatus, and by monitoring the change in load by the power transmission-side apparatus, it is determined whether there is foreign matter between the power transmitting and receiving coils. Hence, the power reception-side apparatus requires a dedicated control circuit that makes an intermittent change in load, and the power transmission-side apparatus requires a dedicated control circuit that monitors a change in load. Thus, the number of components increases in both of the power transmission-side apparatus and the power reception-side apparatus, causing an increase in the size and cost of the apparatuses.

The present invention is made to solve problems such as those described above, and an object of the present invention is to provide a power transmission-side apparatus capable of detecting an abnormality caused by foreign matter only by the power transmission side.

Solution to Problem

A power transmission-side apparatus according to the present invention includes: a resonance type transmission power supply device to convert input power into high-frequency power and to output the high-frequency power; and a power transmitting coil to transmit the high-frequency power outputted from the resonance type transmission power supply device, and the resonance type transmission power supply device includes: a switching element to perform switching operation; a switching parameter detector to detect a switching voltage of the switching element; and an abnormality detector to detect an abnormality caused by foreign matter, on the basis of a result of the detection by the switching parameter detector.

Advantageous Effects of Invention

According to the present invention, since a configuration thereof is formed in the above-described manner, an abnormality caused by foreign matter can be detected only by the power transmission side.

BRIEF DESCRIPTION OF DRAWINGS

FIG. 5A is a diagram showing a case in which there is no foreign matter between power transmitting and receiving coils, and FIG. 5B is a diagram showing a case in which there is foreign matter between the power transmitting and receiving coils.

FIGS. 6A to 6C are diagrams showing an example of foreign matter inserted between the power transmitting and receiving coils of the first embodiment of the present invention.

FIG. 7A is a diagram showing an example of changes in switching voltage and FIG. 7B is a diagram showing an example of changes in input current.

FIG. 8 is a diagram showing an example of abnormality detection conditions used by the resonance type transmission power supply device according to the first embodiment of the present invention.

FIGS. 9A and 9B are diagrams showing a hardware configuration example of the control circuit of the first embodiment of the present invention.

DESCRIPTION OF EMBODIMENTS

An embodiment of the present invention will be described in detail below with reference to the drawings.

First Embodiment

Figure 1:
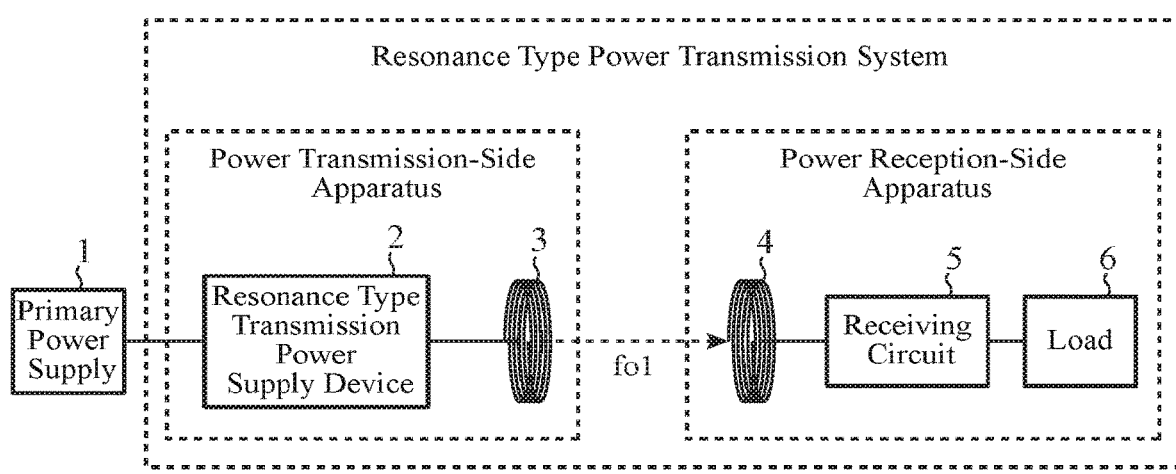
FIG. 1 is a diagram showing a configuration example of a resonance type power transmission system according to a first embodiment of the present invention.

FIG. 1 is a diagram showing a configuration example of a resonance type power transmission system according to a first embodiment of the present invention.

The resonance type power transmission system includes, as shown in FIG. 1, a resonance type transmission power supply device 2, a power transmitting coil 3, a power receiving coil 4, a receiving circuit 5, and a load 6. In FIG. 1, a primary power supply 1 is connected to an input stage of the resonance type transmission power supply device 2. The primary power supply 1 outputs direct-current power or alternating-current power. In addition, the resonance type transmission power supply device 2 and the power transmitting coil 3 form a power transmission-side apparatus, and the power receiving coil 4, the receiving circuit 5, and the load 6 form a power reception-side apparatus.

The resonance type transmission power supply device 2 is a class-E high-frequency inverter circuit that converts power (input power) outputted from the primary power supply 1 into high-frequency power (output power) having the same (including the meaning of substantially the same) frequency as the resonance frequency (in FIG. 1, fo1) of the power transmitting coil 3, and outputs the high-frequency power. Details of the resonance type transmission power supply device 2 will be described later.

The power transmitting coil 3 performs power transmission by resonating at the same (including the meaning of substantially the same) frequency as the frequency of the high-frequency power outputted from the resonance type transmission power supply device 2.

The power receiving coil 4 receives the high-frequency power transmitted from the power transmitting coil 3 by resonating at the same (including the meaning of substantially the same) frequency as the resonance frequency of the power transmitting coil 3. The high-frequency power (alternating-current power) received by the power receiving coil 4 is outputted to the receiving circuit 5.

Note that a power transmission method between the power transmitting coil 3 and the power receiving coil 4 is not particularly limited, and any of a magnetic field resonance method, an electrical field resonance method, and an electromagnetic induction method may be used. Note also that the power transmitting coil 3 and the power receiving coil 4 are not limited to non-contact coils such as those shown in FIG. 1.

The receiving circuit 5 performs rectification or rectification and voltage conversion on the alternating-current power outputted from the power receiving coil 4, in accordance with the specifications of the load 6. Namely, the configuration of the receiving circuit 5 includes one including a rectifier circuit or one including a rectifier circuit and a receiving power supply (a DC/DC converter, a DC/AC converter, or the like). The power obtained by the receiving circuit 5 is outputted to the load 6.

The load 6 is a circuit or an apparatus that functions by the power outputted from the receiving circuit 5.

Next, a configuration example of the resonance type transmission power supply device 2 will be described with reference to FIG. 2.

Figure 2:
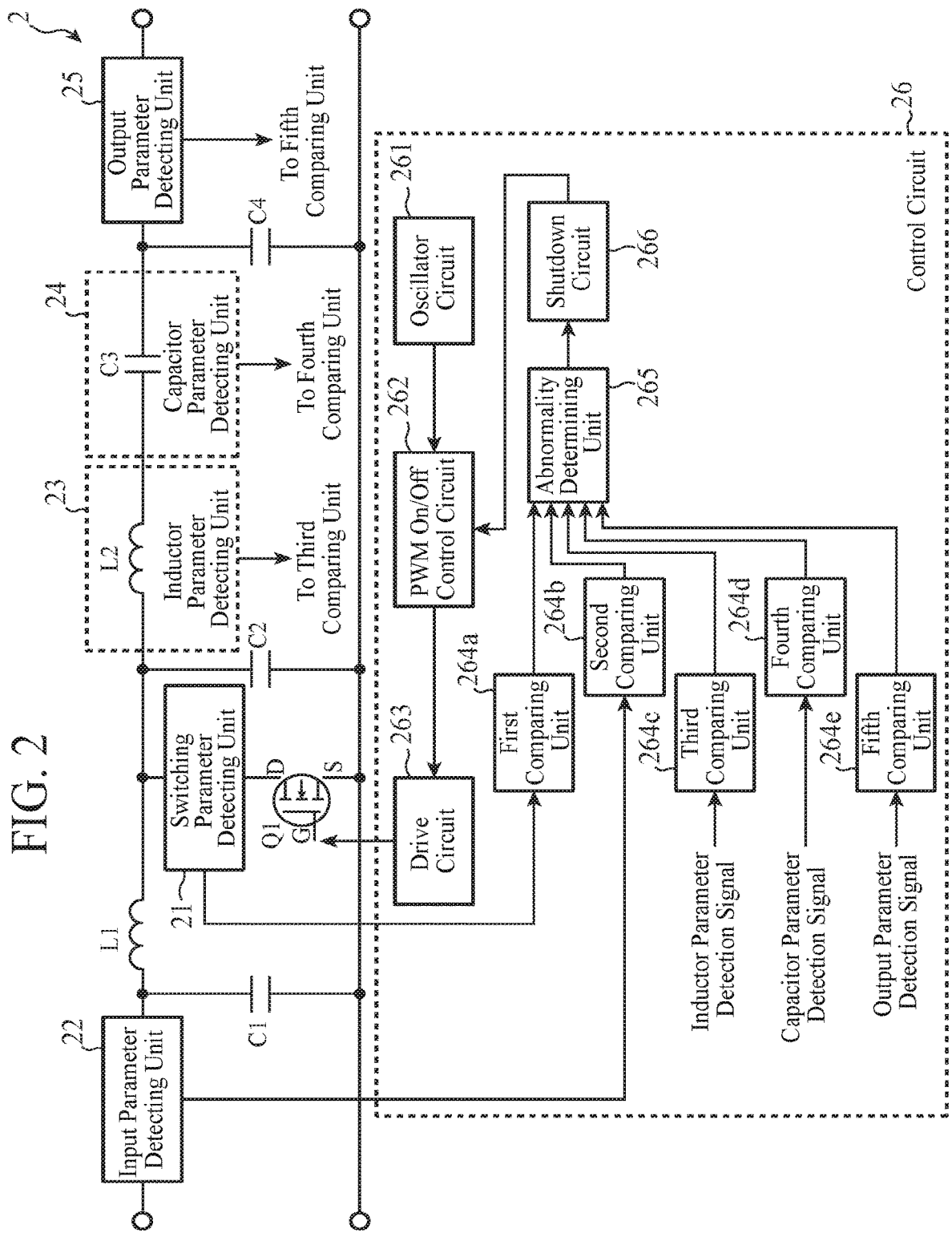
FIG. 2 is a diagram showing a configuration example of a resonance type transmission power supply device according to the first embodiment of the present invention.

The resonance type transmission power supply device 2 includes, as shown in FIG. 2, a filter (capacitor C1), an inductor L1, a switching element Q1, a resonant circuit (capacitors C2 and C3 and an inductor L2), a resonant matching circuit (capacitor C4), a switching parameter detecting unit 21, an input parameter detecting unit 22, an inductor parameter detecting unit 23, a capacitor parameter detecting unit 24, an output parameter detecting unit 25, and a control circuit 26. Note that the inductor parameter detecting unit 23 and the capacitor parameter detecting unit 24 form a resonant circuit parameter detecting unit.

One end of the capacitor C1 is connected to one (positive terminal) of a pair of input terminals, and the other end of the capacitor C1 is connected to the other one (negative terminal) of the pair of input terminals. In FIG. 2, one end of the capacitor C1 is connected to one of the above-described pair of input terminals through the input parameter detecting unit 22.

The inductor L1 temporarily holds input power every time operation of the switching element Q1 is performed. One end of the inductor L1 is connected to the one end of the capacitor C1.

The switching element Q1 is a field effect transistor (FET) that performs switching operation at a high frequency. A drain terminal of the switching element Q1 is connected to the other end of the inductor L1, and a source terminal of the switching element Q1 is connected to the other end of the capacitor C1. In FIG. 2, the drain terminal of the switching element Q1 is connected to the other end of the inductor L1 through the switching parameter detecting unit 21. In addition, a drive circuit 263 which will be described later in the control circuit 26 is connected to a gate terminal of the switching element Q1, and the switching element Q1 is driven on the basis of a gate drive signal outputted from the drive circuit 263.

The resonant circuit (the capacitors C2 and C3 and the inductor L2) makes the switching operation of the switching element Q1 to be resonant switching operation. Namely, by the resonant circuit, a switching condition is set such that zero-voltage switching (ZVS) is achieved so that the switching operation by the switching element Q1 has the smallest switching loss, the switching loss being defined by the product of a switching current (drain-source current) Ids and a switching voltage (drain-source voltage) Vds.

One end of the capacitor C2 is connected to the other end of the inductor L1, and the other end of the capacitor C2 is connected to the other end of the capacitor C1. In addition, one end of the inductor L2 is connected to the other end of the inductor L1. In addition, one end of the capacitor C3 is connected to the other end of the inductor L2.

The resonant matching circuit (capacitor 4) allows an output impedance of the resonance type transmission power supply device 2 to match an input impedance of the power transmitting coil 3 connected to the resonance type transmission power supply device 2 (allows a resonance condition to match between the resonance type transmission power supply device 2 and the power transmitting coil 3). Note that the resonant matching circuit may be of any of a fixed matching type in which the constant of an element forming the resonant matching circuit is fixed, a variable matching type in which the constant of the element is variable, and an automatic matching type in which the constant of the element can be automatically changed to achieve matching.

One end of the capacitor C4 is connected to the other end of the capacitor C3, and the other end of the capacitor C4 is connected to the other end of the capacitor C1.

The switching parameter detecting unit 21 detects the switching voltage Vds of the switching element Q1 or the switching voltage Vds and switching current Ids of the switching element Q1. A signal indicating a result of the detection by the switching parameter detecting unit 21 (switching parameter detection signal) is outputted to a first comparing unit 264a which will be described later in the control circuit 26.

The input parameter detecting unit 22 detects a current of input power (input current) Iin. A signal indicating a result of the detection by the input parameter detecting unit 22 (input parameter detection signal) is outputted to a second comparing unit 264b which will be described later in the control circuit 26. Note that the input parameter detecting unit 22 is not an essential configuration and may not be provided.

The inductor parameter detecting unit 23 detects at least one of a voltage (a voltage at both ends of the inductor L2) VL and a current (a current flowing through the inductor L2) IL of the inductor L2. A signal indicating a result of the detection by the inductor parameter detecting unit 23 (inductor parameter detection signal) is outputted to a third comparing unit 264c which will be described later in the control circuit 26. Note that the inductor parameter detecting unit 23 is not an essential configuration and may not be provided.

The capacitor parameter detecting unit 24 detects at least one of a voltage (a voltage at both ends of the capacitor C3) Vc and a current (a current flowing through the capacitor C3) Ic of the capacitor C3. A signal indicating a result of the detection by the capacitor parameter detecting unit 24 (capacitor parameter detection signal) is outputted to a fourth comparing unit 264d which will be described later in the control circuit 26. Note that the capacitor parameter detecting unit 24 is not an essential configuration and may not be provided.

The output parameter detecting unit 25 detects at least one of a voltage (output voltage) Vout and a current (output current) Iout of output power. A signal indicating a result of the detection by the output parameter detecting unit 25 (output parameter detection signal) is outputted to a fifth comparing unit 264e which will be described later in the control circuit 26. Note that the output parameter detecting unit 25 is not an essential configuration and may not be provided.

Each function of the switching parameter detecting unit 21, the input parameter detecting unit 22, the inductor parameter detecting unit 23, the capacitor parameter detecting unit 24, and the output parameter detecting unit 25 can be implemented by providing a dedicated circuit in the resonance type transmission power supply device 2.

Note that each function of the switching parameter detecting unit 21, the input parameter detecting unit 22, and the output parameter detecting unit 25 can also be implemented by using a protection function in a shared manner that is normally provided in the resonance type transmission power supply device 2, and in that case, a dedicated circuit is not necessary.

The control circuit 26 controls power supply to be performed by the resonance type transmission power supply device 2. The control circuit 26 includes, as shown in FIG. 2, an oscillator circuit 261, a pulse width modulation (PWM) on/off control circuit 262, the drive circuit 263, the first to fifth comparing units 264a to 264e, an abnormality determining unit 265, and a shutdown circuit 266. Note that the first to fifth comparing units 264a to 264e and the abnormality determining unit 265 form an abnormality detecting unit.

The oscillator circuit 261 generates a drive signal and outputs the drive signal to the PWM on/off control circuit 262. For example, the oscillator circuit 261 generates a square wave with 6.78 MHz as a drive signal, and outputs the drive signal to the PWM on/off control circuit 262.

The PWM on/off control circuit 262 is driven by the drive signal outputted from the oscillator circuit 261, generates a pulse-like voltage signal (PWM signal) having a predetermined pulse width, and outputs the voltage signal to the drive circuit 263. The PWM on/off control circuit 262 has a function of changing the pulse width and a function of controlling a soft-start and a soft-off.

In addition, the PWM on/off control circuit 262 stops the output of the PWM signal to the drive circuit 263 when a signal instructing a forced stop is outputted from the shutdown circuit 266. At this time, the PWM on/off control circuit 262 controls the pulse width of the above-described PWM signal such that the resonance type transmission power supply device 2 performs a soft-off.

In addition, the PWM on/off control circuit 262 resumes the output of the PWM signal to the drive circuit 263 when a signal instructing an automatic return is outputted from the shutdown circuit 266. At this time, the PWM on/off control circuit 262 controls the pulse width of the above-described PWM signal such that the resonance type transmission power supply device 2 performs a soft-start.

The drive circuit 263 generates a high-frequency gate drive signal on the basis of the voltage signal outputted from the PWM on/off control circuit 262, and outputs the high-frequency gate drive signal to the gate terminal of the switching element Q1.

The first comparing unit 264a compares a characteristic of a parameter detected by the switching parameter detecting unit 21 with a threshold value (normal range). Here, when only the switching voltage Vds is detected by the switching parameter detecting unit 21, the first comparing unit 264a compares the amplitude or waveform of the switching voltage Vds with a threshold value. In addition, when the switching voltage Vds and the switching current Ids are detected by the switching parameter detecting unit 21, the first comparing unit 264a compares, in addition to that described above, the amplitude or waveform of the switching current Ids with a threshold value. A signal indicating a result of the comparison by the first comparing unit 264a is outputted to the abnormality determining unit 265.

The second comparing unit 264b compares a characteristic (an average value, an amplitude, or a waveform) of the input current Iin detected by the input parameter detecting unit 22 with a threshold value (normal range). A signal indicating a result of the comparison by the second comparing unit 264b is outputted to the abnormality determining unit 265. Note that when the input parameter detecting unit 22 is not provided, the second comparing unit 264b is not necessary.

The third comparing unit 264c compares a characteristic of a parameter detected by the inductor parameter detecting unit 23 with a threshold value (normal range). Namely, the third comparing unit 264c compares one or more of the amplitude or waveform of the voltage VL detected by the inductor parameter detecting unit 23, the amplitude or waveform of the current IL detected by the inductor parameter detecting unit 23, and a phase difference between the voltage VL and the current IL with a threshold value. A signal indicating a result of the comparison by the third comparing unit 264c is outputted to the abnormality determining unit 265. Note that when the inductor parameter detecting unit 23 is not provided, the third comparing unit 264c is not necessary.

The fourth comparing unit 264d compares a characteristic of a parameter detected by the capacitor parameter detecting unit 24 with a threshold value (normal range). Namely, the fourth comparing unit 264d compares one or more of the amplitude or waveform of the voltage Vc detected by the capacitor parameter detecting unit 24, the amplitude or waveform of the current Ic detected by the capacitor parameter detecting unit 24, and a phase difference between the voltage Vc and the current Ic with a threshold value. A signal indicating a result of the comparison by the fourth comparing unit 264d is outputted to the abnormality determining unit 265. Note that when the capacitor parameter detecting unit 24 is not provided, the fourth comparing unit 264d is not necessary.

The fifth comparing unit 264e compares a characteristic of a parameter detected by the output parameter detecting unit 25 with a threshold value (normal range). Namely, the fifth comparing unit 264e compares one or more of the amplitude or waveform of the output voltage Vout detected by the output parameter detecting unit 25, the amplitude or waveform of the output current Iout detected by the output parameter detecting unit 25, and a phase difference between the output voltage Vout and the output current Iout with a threshold value. A signal indicating a result of the comparison by the fifth comparing unit 264e is outputted to the abnormality determining unit 265. Note that when the output parameter detecting unit 25 is not provided, the fifth comparing unit 264e is not necessary.

The abnormality determining unit 265 determines whether an abnormality has occurred, on the basis of the results of the comparisons by the first to fifth comparing units 264a to 264e. Then, if the abnormality determining unit 265 determines that an abnormality has occurred, the abnormality determining unit 265 outputs a signal indicating such a fact (abnormal signal) to the shutdown circuit 266.

When an abnormal signal is outputted from the abnormality determining unit 265, the shutdown circuit 266 outputs a signal instructing the PWM on/off control circuit 262 to perform a forced stop. In addition, after a lapse of a certain period from the output of the signal instructing a forced stop, the shutdown circuit 266 outputs a signal instructing the PWM on/off control circuit 262 to perform an automatic return.

Next, an operation example of the control circuit 26 of the first embodiment will be described with reference to FIG. 3. In the following, it is assumed that the resonance type transmission power supply device 2 is in the process of feeding power and the detecting units 21 to 25 detect a switching voltage Vds, a switching current Ids, an input current Iin, a voltage VL, a current IL, a voltage Vc, a current Ic, an output voltage Vout, and an output current Iout.

Figure 3:
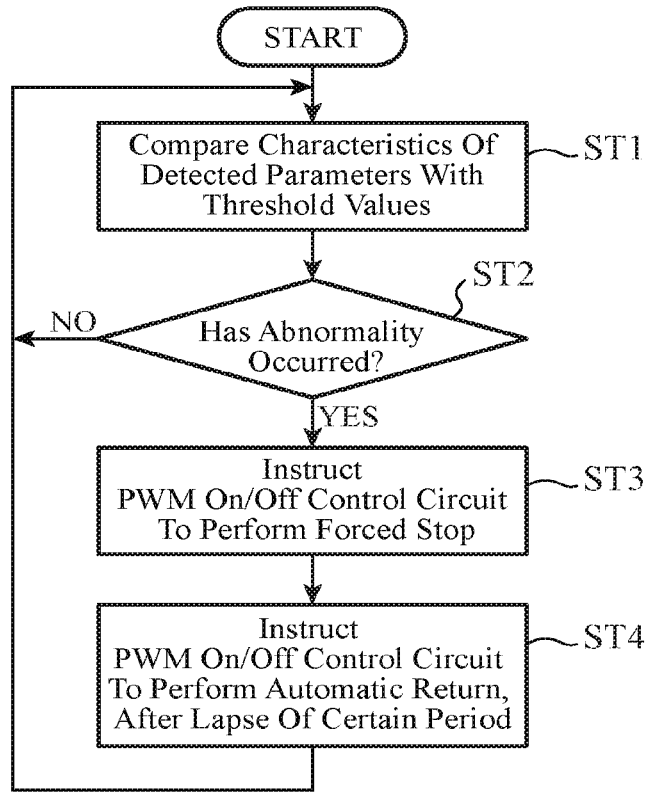
FIG. 3 is a flowchart showing an operation example of a control circuit of the first embodiment of the present invention.

In the operation example of the control circuit 26, as shown in FIG. 3, first, the first to fifth comparing units 264a to 264e compare the characteristics of parameters detected by their corresponding detecting units 21 to 25 with threshold values (in step ST1).

Figure 4:
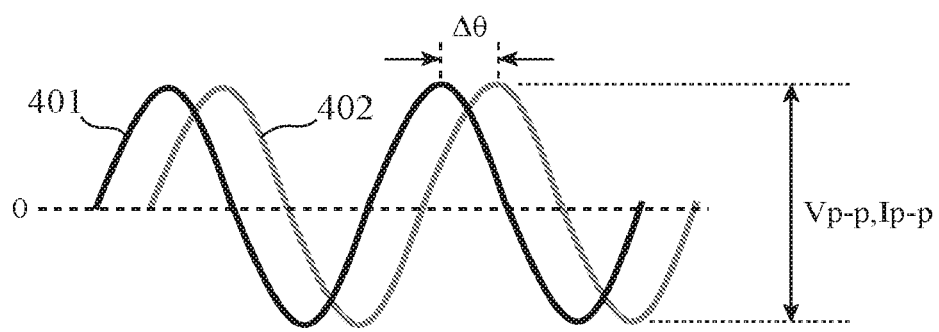
FIG. 4 is a diagram showing an example of an output voltage and an output current which are detected by the resonance type transmission power supply device according to the first embodiment of the present invention.

For example, FIG. 4 shows an example of the output voltage Vout and the output current Iout which are detected by the output parameter detecting unit 25. In FIG. 4, reference sign 401 indicates the waveform of the output voltage Vout, and reference sign 402 indicates the waveform of the output current Iout.

As shown in this FIG. 4, the fifth comparing unit 264e calculates one or more of the amplitude Vp-p or waveform of the output voltage Vout, the amplitude Ip-p or waveform of the output current Iout, and a phase difference A0 between the output voltage Vout and the output current Iout, from the output voltage Vout and output current Iout detected by the output parameter detecting unit 25, and compares them with threshold values. Note that the amplitude Vp-p of the output voltage Vout and the amplitude Ip-p of the output current Iout are peak values.

Figure 5A:
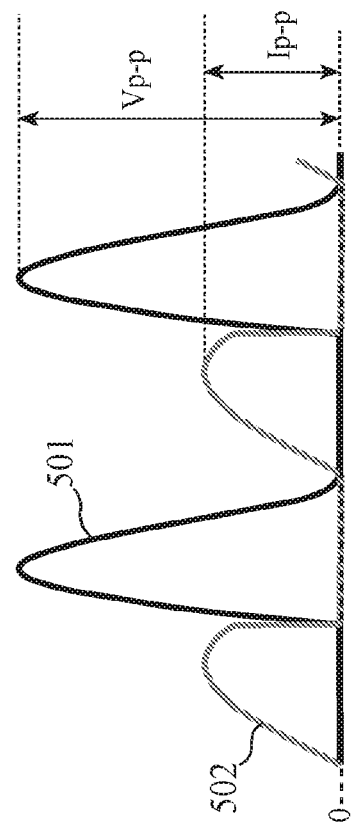
FIGS. 5A and 5B are diagrams showing examples of a switching voltage and a switching current which are detected by the resonance type transmission power supply device according to the first embodiment of the present invention.
Figure 5B:
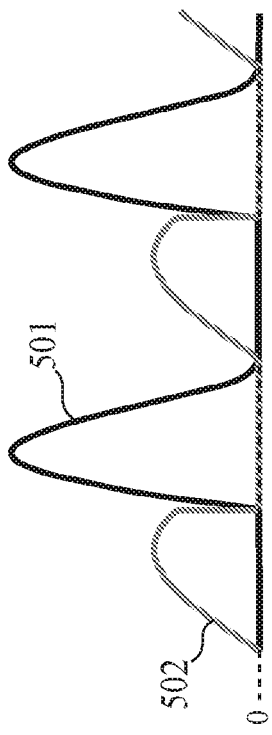

In addition, FIG. 5 shows examples of the switching voltage Vds and the switching current Ids which are detected by the switching parameter detecting unit 21. Note that FIG. 5A shows a case in which there is no foreign matter 10 between the power transmitting and receiving coils 3 and 4, and FIG. 5B shows a case in which there is foreign matter 10 between the power transmitting and receiving coils 3 and 4. In addition, in FIG. 5, reference sign 501 indicates the waveform of the switching voltage Vds, and reference sign 502 indicates the waveform of the switching current Ids.

As shown in this FIG. 5, the first comparing unit 264a calculates the amplitude Ip-p or waveform of the switching current Ids in addition to the amplitude Vp-p or waveform of the switching voltage Vds, from the switching voltage Vds and switching current Ids detected by the switching parameter detecting unit 21, and compares them with their threshold values. Note that the amplitude Vp-p of the switching voltage Vds and the amplitude Ip-p of the switching current Ids are peak values.

In addition, as shown in FIG. 5, when there is foreign matter 10 between the power transmitting and receiving coils 3 and 4, the amplitude Vp-p of the switching voltage Vds greatly changes as compared with the case in which there is no foreign matter 10 between the power transmitting and receiving coils 3 and 4. Likewise, the amplitude Ip-p of the switching current Ids also changes. Hence, the first comparing unit 264a can detect changes in characteristics made depending on whether there is foreign matter 10 between the power transmitting and receiving coils 3 and 4, by comparing the characteristics of the switching voltage Vds and switching current Ids detected by the switching parameter detecting unit 21 with their threshold values.

Then, the abnormality determining unit 265 determines whether an abnormality has occurred, on the basis of the results of the comparisons by the first to fifth comparing units 264a to 264e (in step ST2).

Figure 7A:
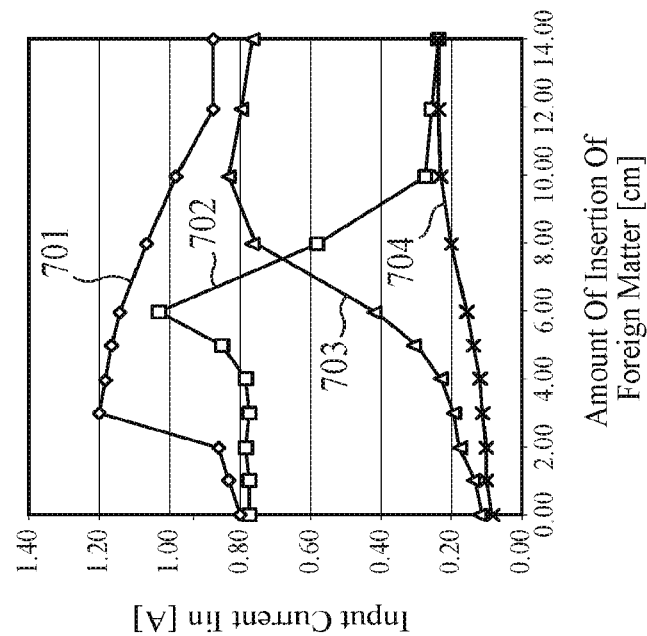
FIGS. 7A and 7B are diagrams showing an example of changes in parameters detected by the resonance type transmission power supply device according to the first embodiment of the present invention.
Figure 7B:
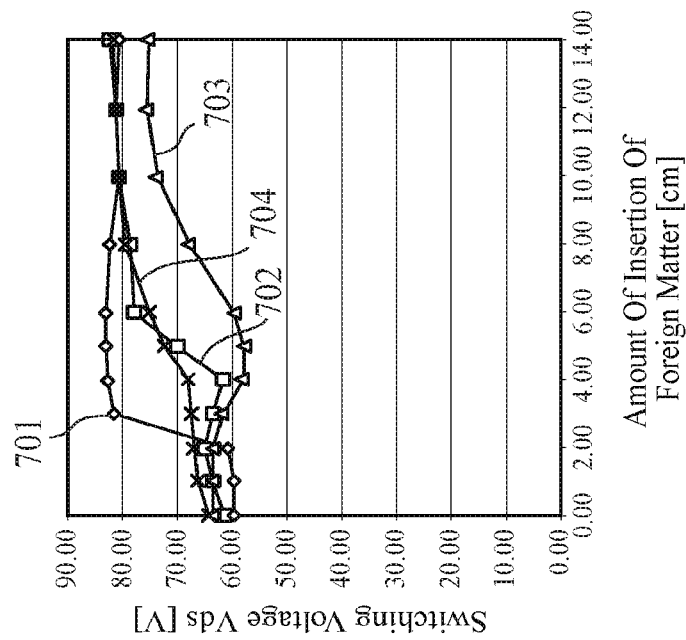

FIG. 7 shows an example of changes in switching voltage Vds and input current Iin made depending on the amount of insertion of the foreign matter 10. Here, a case is assumed in which, as shown in FIG. 6, the foreign matter 10 is inserted horizontally between the power transmitting and receiving coils 3 and 4. The foreign matter 10 is a DVD or a piece of aluminum foil.

In this case, as shown in FIG. 7, the switching voltage Vds and the input current Iin change depending on the amount of insertion of the foreign matter 10. In FIG. 7, reference sign 701 indicates a case in which the foreign matter 10 is a DVD and there is a power reception-side apparatus (two power receiving coils 4). In addition, reference sign 702 indicates a case in which the foreign matter 10 is a piece of aluminum foil and there is a power reception-side apparatus (two power receiving coils 4). In addition, reference sign 703 indicates a case in which the foreign matter 10 is a DVD and there is no power reception-side apparatus. In addition, reference sign 704 indicates a case in which the foreign matter 10 is a piece of aluminum foil and there is no power reception-side apparatus.

Here, when the foreign matter 10 is a piece of aluminum foil (with or without a power reception-side apparatus) and when the foreign matter 10 is a DVD (with a power reception-side apparatus), changes in switching voltage Vds increase on the basis of the amount of insertion of the foreign matter 10.

Hence, the abnormality determining unit 265 determines that there is an abnormality when the first comparing unit 264a determines that the amplitude of the switching voltage Vds exceeds a threshold value (e.g., 80 V). By this, the above-described foreign matter 10 can be detected.

Meanwhile, when the foreign matter 10 is a DVD (without a power reception-side apparatus), changes in switching voltage Vds relative to the amount of insertion of the foreign matter 10 are small.

Hence, the abnormality determining unit 265 cannot detect the above-described foreign matter 10 only by a result of the comparison by the first comparing unit 264a.

On the other hand, when the foreign matter 10 is a DVD (without a power reception-side apparatus), changes in input current Iin increase on the basis of the amount of insertion of the foreign matter 10.

Hence, even if the first comparing unit 264a determines that the amplitude of the switching voltage Vds does not exceed the threshold value (e.g., 80 V), when the second comparing unit 264b determines that the amplitude (amount of change) of the input current Iin exceeds a threshold value (e.g., 0.6 A), the abnormality determining unit 265 determines that there is an abnormality. By this, the above-described foreign matter 10 can be detected.

In the foreign matter 10, a feature of lines of magnetic force passing through the foreign matter 10 differs depending on materials thereof, and the flow of eddy current differs depending on materials thereof. In a piece of aluminum foil, a line of magnetic force cannot pass through and an eddy current is less likely to occur. On the other hand, in a DVD, since a line of magnetic force slightly passes through, an eddy current is relatively likely to occur. As such, since the DVD behaves as if there were a power reception-side apparatus, it is difficult to detect the DVD as the foreign matter 10. As with the DVD, it is also difficult to detect a Blu-ray as the foreign matter 10.

On the other hand, in the resonance type transmission power supply device 2 according to the first embodiment, by measuring changes in both the switching voltage Vds and the input current Iin, it becomes possible to detect a DVD and a Blu-ray as the foreign matter 10.

FIG. 8 shows an example of abnormality detection conditions used by the resonance type transmission power supply device 2.

As shown in FIG. 8, in a case in which the foreign matter 10 is a piece of aluminum foil, the abnormality determining unit 265 determines that there is an abnormality when the first comparing unit 264a determines that the switching voltage Vds is overvoltage.

In addition, as shown in FIG. 8, in a case in which the foreign matter 10 is a DVD, the abnormality determining unit 265 determines that there is an abnormality when the first comparing unit 264a determines that the switching voltage Vds is overvoltage or the second comparing unit 264b determines that the amplitude (amount of change) of the input current Iin is overcurrent. In this case, the abnormality determining unit 265 makes a determination using results of comparisons by the first comparing unit 264a and the second comparing unit 264b obtained during predetermined set time, on the basis of conditions upon insertion of the foreign matter 10, whether the resonance type transmission power supply device 2 is at start-up or during power transmission, and the amount of insertion of the foreign matter 10.

In addition, when the power transmission-side apparatus maintains a power transmission state with no power reception-side apparatus installed, the switching voltage Vds may become overvoltage. Thus, in this case, too, the abnormality determining unit 265 can determine that there is an abnormality.

Note that although the above description shows an abnormality determination for a case of using the switching voltage Vds and the input current Iin, by making an abnormality determination on the basis of other parameters, determination accuracy is improved.

Therefore, the abnormality determining unit 265 also has a function of determining whether a result of detection involving the foreign matter 10 is abnormal, and thereby consequently identifying the material of the foreign matter 10. Hence, for example, when the abnormality determining unit 265 determines that the foreign matter 10 is a substance which is not a power reception-side apparatus and whose purpose is to generate heat (a sheet for floor heating that uses heat generation by an eddy current, etc.), instead of determining that a result of detection involving the foreign matter 10 is abnormal (instead of outputting an abnormal signal to the shutdown circuit 266), power feeding by the resonance type transmission power supply device 2 may be allowed to continue.

If, at this step ST2, the abnormality determining unit 265 determines that an abnormality has occurred, the abnormality determining unit 265 outputs an abnormal signal to the shutdown circuit 266, and the sequence transitions to step ST3.

Then, the shutdown circuit 266 outputs a signal instructing the PWM on/off control circuit 262 to perform a forced stop (in step ST3). Then, in response to the above-described instruction, the PWM on/off control circuit 262 stops the output of a PWM signal to the drive circuit 263, and the drive circuit 263 stops the output of a gate drive signal. At this time, the PWM on/off control circuit 262 controls the pulse width of the above-described PWM signal such that the resonance type transmission power supply device 2 performs a soft-off. By this, the power feeding by the resonance type transmission power supply device 2 stops.

Then, after a lapse of a certain period from the output of the signal instructing a forced stop (e.g., three seconds later), the shutdown circuit 266 outputs a signal instructing the PWM on/off control circuit 262 to perform an automatic return (in step ST4). Then, in response to the above-described instruction, the PWM on/off control circuit 262 resumes the output of a PWM signal to the drive circuit 263, and the drive circuit 263 resumes the output of a gate drive signal. At this time, the PWM on/off control circuit 262 controls the pulse width of the above-described PWM signal such that the resonance type transmission power supply device 2 performs a soft-start. By this, power feeding by the resonance type transmission power supply device 2 is resumed. Thereafter, the sequence returns to step ST1, and the above-described processes are repeated.

In addition, if, at step ST2, the abnormality determining unit 265 determines that an abnormality has not occurred, the sequence returns to step ST1, and the above-described process is repeated. By this, the power feeding by the resonance type transmission power supply device 2 continues.

Note that the above description shows a case in which the first comparing unit 264a sets the threshold value for the amplitude of the switching voltage Vds to, for example, 80 V. However, the threshold value is not limited thereto and a plurality of threshold values may be set. The same also applies to the second comparing unit 264b to the fifth comparing unit 264e.

For example, the first comparing unit 264a sets, for example, two threshold values 70 V and 80 V for the amplitude of the switching voltage Vds. Then, when the first comparing unit 264a determines that the amplitude of the switching voltage Vds exceeds 80 V, as in the above description, the abnormality determining unit 265 determines that there is an abnormality. In addition, when the first comparing unit 264a determines that the amplitude of the switching voltage Vds exceeds 70 V but is less than 80 V, the abnormality determining unit 265 checks a result of the comparison by the second comparing unit 264b. Then, when the second comparing unit 264b determines that the input current Iin exceeds 0.6 A, the abnormality determining unit 265 determines that there is an abnormality. By this, determination accuracy is improved.

As described above, according to the first embodiment, since the power transmission-side apparatus includes: the switching parameter detecting unit 21 that detects a switching voltage of the switching element Q1; and the abnormality detecting unit (the first comparing unit 264a and the abnormality determining unit 265) that detects an abnormality caused by foreign matter, on the basis of a result of the detection by the switching parameter detecting unit 21, an abnormality caused by foreign matter can be detected only by the power transmission side.

In addition, in the resonance type transmission power supply device 2 according to the first embodiment, each function of the detecting units 21, 22, and 25 can be implemented by using the protection function in a shared manner that is already provided in the resonance type transmission power supply device 2. Hence, dedicated detectors, dedicated control circuits, and the like, such as those used conventionally are not necessary, and an abnormality can be detected only by changing the design of the control circuit 26. Thus, the number of components of the resonance type transmission power supply device 2 can be reduced, achieving a reduction in the size, weight, cost, and power consumption of the apparatus.

In addition, since an abnormality can be detected only by the resonance type transmission power supply device 2, exchange of information between the power transmission-side apparatus and the power reception-side apparatus such as that performed conventionally is not necessary, improving convenience. In addition, a reduction in the size, weight, cost, and power consumption of the entire system can be achieved.

Finally, with reference to FIG. 9, a hardware configuration example of the control circuit 26 of the first embodiment will be described.

Each function of the oscillator circuit 261, the PWM on/off control circuit 262, the drive circuit 263, the first to fifth comparing units 264a to 264e, the abnormality determining unit 265, and the shutdown circuit 266 in the control circuit 26 is implemented by a processing circuit 51. The processing circuit 51 may be, as shown in FIG. 9A, dedicated hardware or may be, as shown in FIG. 9B, a CPU (also referred to as a central processing unit, a processing apparatus, an arithmetic unit, a microprocessor, a microcomputer, a processor, or a digital signal processor (DSP)) 52 that executes a program stored in a memory 53.

When the processing circuit 51 is dedicated hardware, the processing circuit 51 corresponds, for example, to a single circuit, a combined circuit, a programmed processor, a parallel programmed processor, an application specific integrated circuit (ASIC), or a field programmable gate array (FPGA), or a combination thereof. Each of the functions of units including the oscillator circuit 261, the PWM on/off control circuit 262, the drive circuit 263, the first to fifth comparing units 264a to 264e, the abnormality determining unit 265, and the shutdown circuit 266 may be implemented by the processing circuit 51, or the functions of the units may be collectively implemented by the processing circuit 51.

When the processing circuit 51 is the CPU 52, the functions of the oscillator circuit 261, the PWM on/off control circuit 262, the drive circuit 263, the first to fifth comparing units 264a to 264e, the abnormality determining unit 265, and the shutdown circuit 266 are implemented by software, firmware, or a combination of software and firmware. The software and firmware are described as programs and stored in the memory 53. The processing circuit 51 implements the function of each unit by reading and executing the programs stored in the memory 53. Namely, the control circuit 26 includes the memory 53 for storing programs by which, for example, each step shown in FIG. 3 is consequently performed when the programs are executed by the processing circuit 51. In addition, it can also be said that these programs cause a computer to perform a procedure or a method for the oscillator circuit 261, the PWM on/off control circuit 262, the drive circuit 263, the first to fifth comparing units 264a to 264e, the abnormality determining unit 265, and the shutdown circuit 266. Here, the memory 53 corresponds, for example, to a nonvolatile or volatile semiconductor memory such as a random access memory (RAM), a read only memory (ROM), a flash memory, an erasable programmable ROM (EPROM), or an electrically EPROM (EEPROM), a magnetic disk, a flexible disk, an optical disc, a compact disc, a MiniDisc, a DVD, etc.

Note that some of the functions of the oscillator circuit 261, the PWM on/off control circuit 262, the drive circuit 263, the first to fifth comparing units 264a to 264e, the abnormality determining unit 265, and the shutdown circuit 266 may be implemented by dedicated hardware, and some may be implemented by software or firmware. For example, it is possible to implement the function of the oscillator circuit 261 by the processing circuit 51 which is dedicated hardware, and implement the functions of the PWM on/off control circuit 262, the drive circuit 263, the first to fifth comparing units 264a to 264e, the abnormality determining unit 265, and the shutdown circuit 266 by the processing circuit 51 reading and executing programs stored in the memory 53.

As such, the processing circuit 51 can implement the above-described functions by hardware, software, or firmware, or a combination thereof.

Note that in the present invention of the present application, modifications to any component of the embodiment or omissions of any component of the embodiment are possible within the scope of the present invention.

INDUSTRIAL APPLICABILITY

The power transmission-side apparatus according to the present invention can detect an abnormality caused by foreign matter only by the power transmission side, and thus is suitable for use as a power transmission-side apparatus that performs power transmission at a high frequency, etc.

REFERENCE SIGNS LIST

1: Primary power supply, 2: Resonance type transmission power supply device, 3: Power transmitting coil, 4: Power receiving coil, 5: Receiving circuit, 6: Load, 10: Foreign matter, 21: Switching parameter detecting unit, 22: Input parameter detecting unit, 23: Inductor parameter detecting unit, 24: Capacitor parameter detecting unit, 25: Output parameter detecting unit, 26: Control circuit, 51: Processing circuit, 52: CPU, 53: Memory, 261: Oscillator circuit, 262: PWM on/off control circuit, 263: Drive circuit, 264a to 264e: First to fifth comparing units, 265: Abnormality determining unit, and 266: Shutdown circuit.

The invention claimed is:

1. A power transmission-side apparatus comprising:
   a resonance type transmission power supply device to convert input power into high-frequency power and to output the high-frequency power; and
   a power transmitting coil to transmit the high-frequency power outputted from the resonance type transmission power supply device, wherein
   the resonance type transmission power supply device includes:
   a switching element to perform switching operation;
   a switching parameter detector to detect a switching voltage of the switching element; and
   an abnormality detector to detect an abnormality caused by foreign matter, on a basis of a result of the detection by the switching parameter detector.

2. The power transmission-side apparatus according to claim 1, comprising an input parameter detector to detect an input current, wherein
   the abnormality detector detects an abnormality caused by foreign matter, on a basis of a result of the detection by the input parameter detector.

3. The power transmission-side apparatus according to claim 1, wherein the switching parameter detector detects a switching current of the switching element.

4. The power transmission-side apparatus according to claim 1, comprising an output parameter detector to detect at least one of an output voltage and an output current, wherein
   the abnormality detector detects an abnormality caused by foreign matter, on a basis of a result of the detection by the output parameter detector.

5. The power transmission-side apparatus according to claim 1, comprising:
   a resonant circuit to make the switching operation performed by the switching element to be resonant switching operation, the resonant circuit including an inductor and a capacitor connected in series with each other; and
   a resonant circuit parameter unit detector to detect one or more of parameters including a voltage and a current of the inductor and a voltage and a current of the capacitor, wherein
   the abnormality detector detects an abnormality caused by foreign matter, on a basis of a result of the detection by the resonant circuit parameter detector.

6. The power transmission-side apparatus according to claim 1, wherein the power transmitting coil performs power transmission by magnetic field resonance, electrical field resonance, or electromagnetic induction.

7. The power transmission-side apparatus according to claim 1, wherein the abnormality detector identifies a material of foreign matter.

8. The power transmission-side apparatus according to claim 7, wherein when the abnormality detector determines that the foreign matter is a substance which is not a power reception-side apparatus and whose purpose is to generate heat, the abnormality detector does not detect a result of detection involving the foreign matter as an abnormality.

* * * * *